Figure 1:
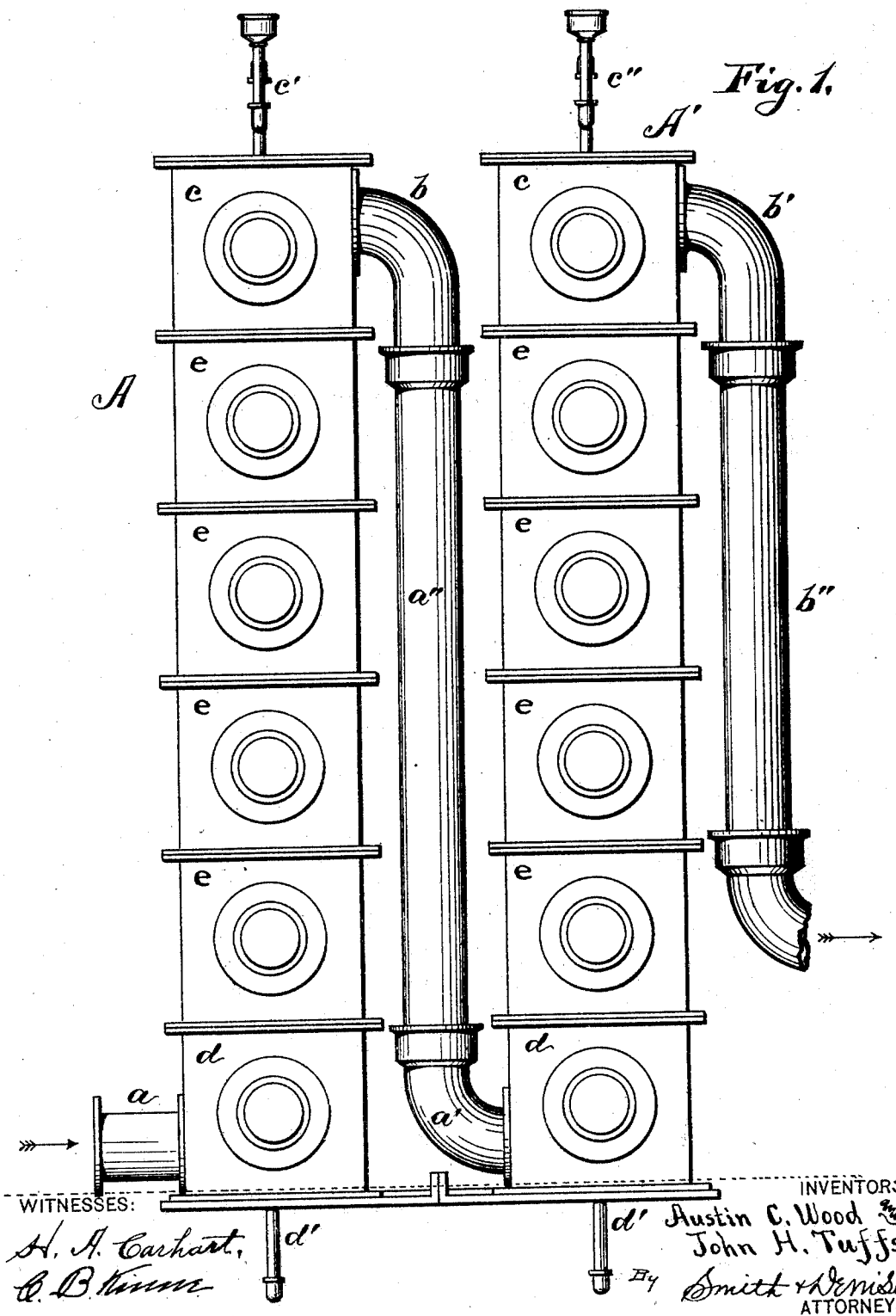

(No Model.) 3 Sheets—Sheet 2.

A. C. WOOD & J. H. TUFFS.
GAS WASHING AND SCRUBBING DEVICE.

No. 503,395. Patented Aug. 15, 1893.

WITNESSES:
H. A. Carhart
C. B. Vinnus

INVENTORS
Austin C. Wood &
John H. Tuffs.
By Smith & Demson
ATTORNEYS.

(No Model.)

A. C. WOOD & J. H. TUFFS.
GAS WASHING AND SCRUBBING DEVICE.

No. 503,395.   Patented Aug. 15, 1893.

WITNESSES:
H. A. Cachart
C. B. Kinne

INVENTORS
Austin C. Wood and
John H. Tuffs.
By Smith & Denison
ATTORNEYS.

UNITED STATES PATENT OFFICE.

AUSTIN C. WOOD AND JOHN H. TUFFS, OF SYRACUSE, NEW YORK.

GAS WASHING AND SCRUBBING DEVICE.

SPECIFICATION forming part of Letters Patent No. 503,395, dated August 15, 1893.

Application filed March 23, 1893. Serial No. 467,250. (No model.)

*To all whom it may concern:*

Be it known that we, AUSTIN C. WOOD and JOHN H. TUFFS, of Syracuse, in the county of Onondaga, in the State of New York, have invented new and useful Improvements in Gas Washing and Scrubbing Devices, of which the following, taken in connection with the accompanying drawings, is a full, clear, and exact description.

Our invention relates to gas washers and scrubbers for purifying gas and separating the ammonia therefrom.

Our object is to produce an ammoniacal liquor and water scrubber in which the gas is brought into the maximum contact with ammoniacal liquor and water, said liquor and water being both substantially stationary and also in motion or flowing or running, or running and dripping, the flow of the gas being zigzag and practically, if not absolutely, unobstructed, and in a direction opposite to that of the liquor and water; and comprising horizontal pans or tanks, and diagonally disposed frames of headers and slats secured together with spaces between the slats, said pans and frames being arranged in sets or pairs, one above another, in a series of benches, comprising a tower, and when desired several towers can be used, each being provided with an ammoniacal liquor or water inlet pipe at the top, and an outlet pipe at the bottom, and having a gas inlet pipe at the bottom or top and a gas discharge pipe at the top or bottom the outlet pipe from one tower being prolonged downward and connected to or forming the inlet pipe to the next; all so that when the liquor and water is let in at the top of the respective towers, it will fill the top pan, overflow therefrom onto the upper end of the frame under this pan, flow down, over, around and between and along the slats, all of said liquor and water being thereby conducted to and discharged into the second pan, and thence onto the second frame, and so on, so that so long as the flow of liquor and water continues, the pans are full and the slats of the frame are covered with running liquor and water, and the gas, as it passes over the tops of the frames through between the slats and along under the slats and over the tops of the pans, is exposed to the liquor and water to the maximum degree, and is purified and the ammonia is extracted therefrom by the liquor and water, in an exceedingly thorough and efficient manner, the ammoniacal liquor finally passing out at the bottom of the respective towers.

Our invention consists in the several novel features of construction and operation hereinafter described and which are specifically set forth in the claims hereunto annexed. It is constructed as follows, reference being had to the accompanying drawings, in which—

Figure 2:
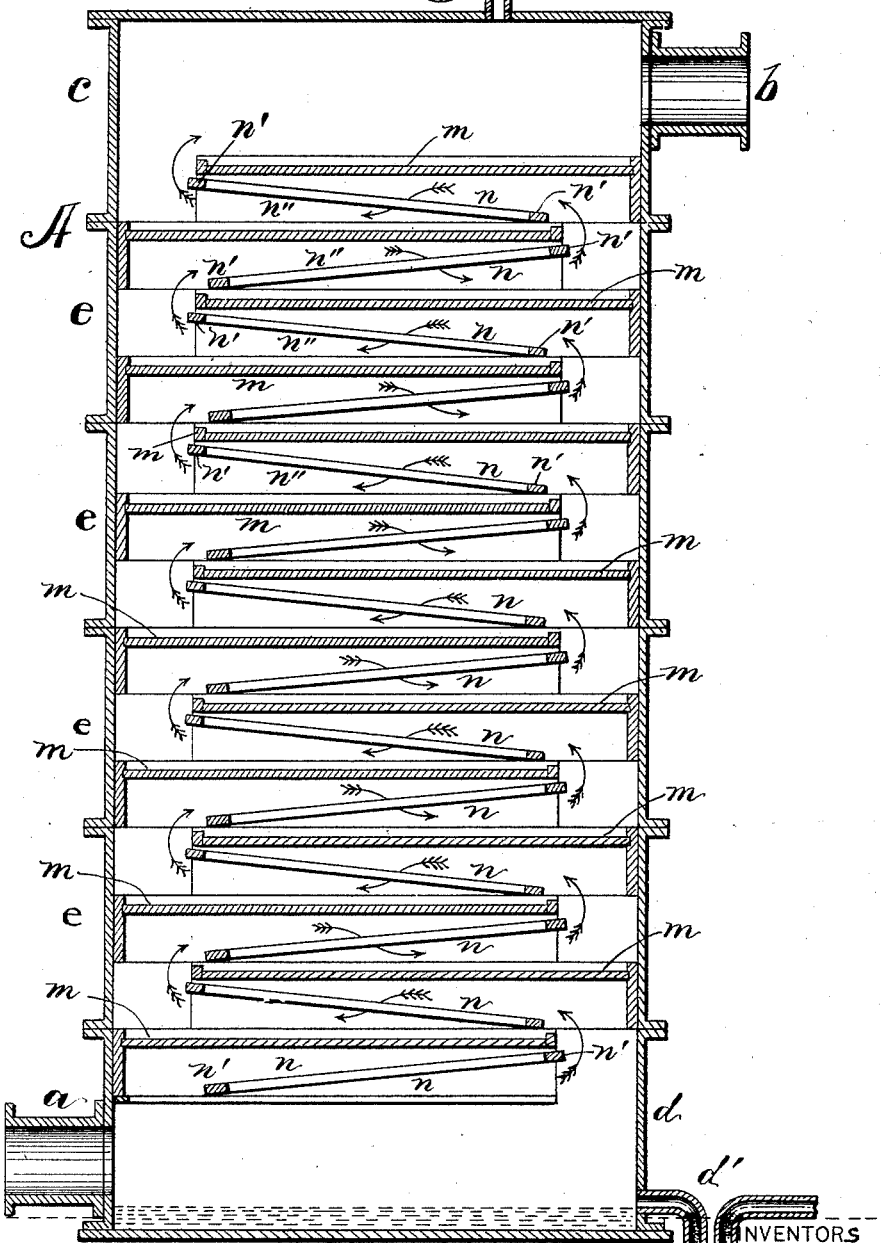
Figure 3:
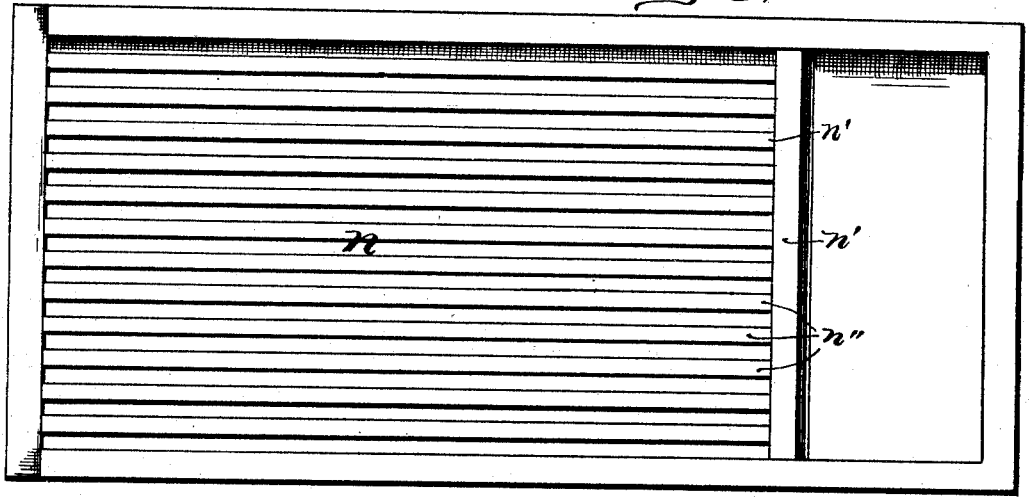
Figure 4:
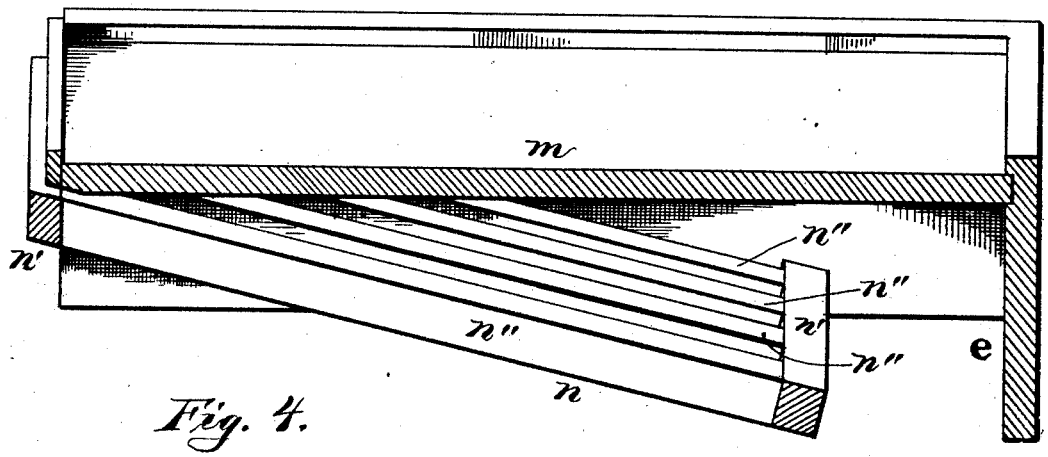

Figure 1, is a front elevation of a scrubber consisting of two towers. Fig. 2, is a vertical longitudinal section of a tower. Fig. 3, is a top plan of one of the slat frames, showing part of the liquor or water pan below it. Fig. 4, is a vertical longitudinal sectional elevation of one of the water pans and of a slat frame below it.

A A′, are the towers, the first being provided with a gas inlet pipe —$a$— at the bottom, a gas outlet pipe —$b$— at the top; the second with the gas inlet pipe —$a'$— at the bottom or top, and the gas pipe —$b'$— at the top or bottom; —$a''$— being the conduit pipe connecting the outlet pipe —$b$— to the inlet pipe —$a'$— and —$b''$— being the conduit pipe for conducting the gas from the outlet pipe —$b'$— to another stack, or to the gas-holder or storage tank. As these towers are counterparts, we will here only describe the construction on one tower. Each tower consists of a top and bottom bench, of box-like form —$c$— and —$d$—, respectively, open on one side, top or bottom, as the case may be; the top bench being provided with the ammoniacal liquor inlet pipe —$c'$—, and water inlet pipe —$c''$—, suitably trapped to prevent the escape of gas, and the gas outlet pipe —$b$— (or $b'$) is connected thereto; and the bottom bench is provided with the trapped liquor outlet pipes —$d'$—, and the gas inlet pipe —$a$— (or $a'$) is connected thereto. The intermediate benches —$e$— consist of boxes, open top and bottom, and all of the benches are flanged exteriorly as part of the means for securing them together in building up the towers. Iron tubes can be substituted for the flanged boxes, the size of boxes or tubes, the number, and the height of the towers to be made to correspond in capacity to the make of gas.

In each bench, one or more flat horizontal tanks or pans —m— are mounted, each somewhat shorter in one direction than the interior of the box on the same line, so that when mounted in alternation, a zigzag passage-way is created through which the gas passes freely, its area in cross-section being at least equal to that of the gas induction pipe, and the eduction pipe also. Under each of these liquor and water-pans, a frame —n— is mounted in an inclined position, consisting of transverse headers —n'— and longitudinal slats —n"—, all usually of wood, though they can be of iron. These frames are shorter than the pans, are mounted so that each pan overflows at its end onto the upper end of the frame below it, and the water runs, flows or trickles down over the top, sides and bottom of each slat; each slat being thus always covered with a film or thin sheet of water, and as substantially all of the gas passes through between the slats, and also is in contact with their upper and lower surfaces; thus, not only giving the gas the maximum contact with water, stationary or in motion, and at the same time presenting the minimum of obstruction, especially when the area of the spaces between the slats in the frame is, at least, equal to that of the inlet and outlet pipes. When the gas has passed upward through the first tower, the outlet and conduit pipes conduct it into the bottom of the second stack, and from that it is conducted to another stack in like manner, or by suitable piping to the holder, or storage tank (not shown).

What we claim as our invention, and desire to secure by Letters Patent, is—

1. A gas washer and scrubber comprising an outer casing, a series of water pans mounted therein, and a series of slat frames mounted in the casing and alternately arranged with said pans creating a zig-zag passage, in combination as set forth.

2. A gas washer and scrubber comprising an inclosing case, water pans, and inclined frames composed of headers and longitudinal slats secured together, both mounted and arranged in alternation with each other, and separate inlet and outlet pipes for gas and water, in combination.

In witness whereof we have hereunto set our hands this 18th day of March, 1893.

AUSTIN C. WOOD.
JOHN H. TUFFS.

In presence of—
HOWARD P. DENISON,
C. W. SMITH.